ically

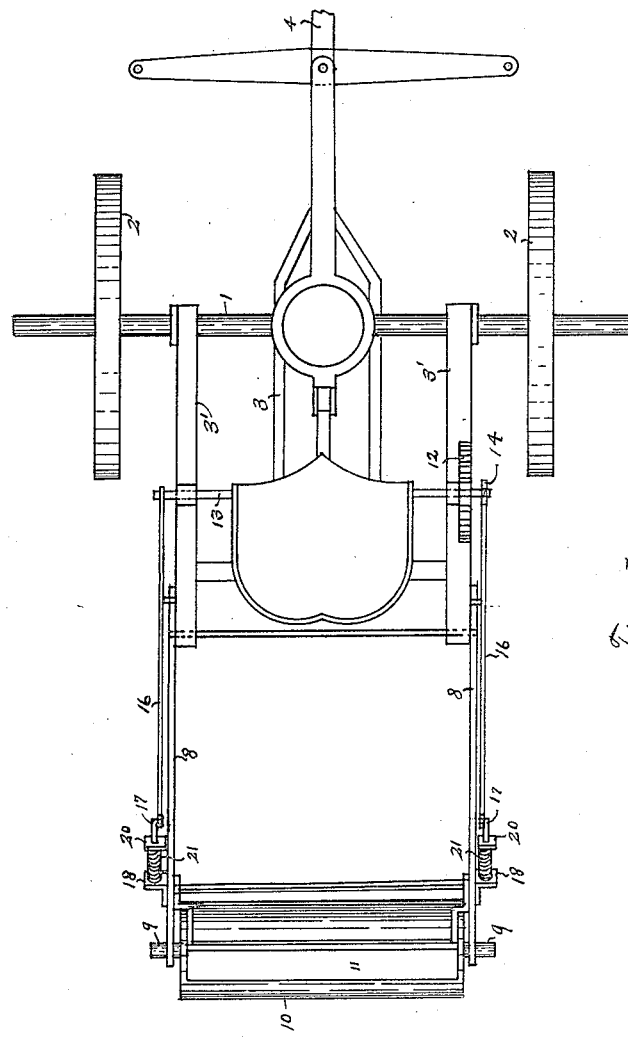

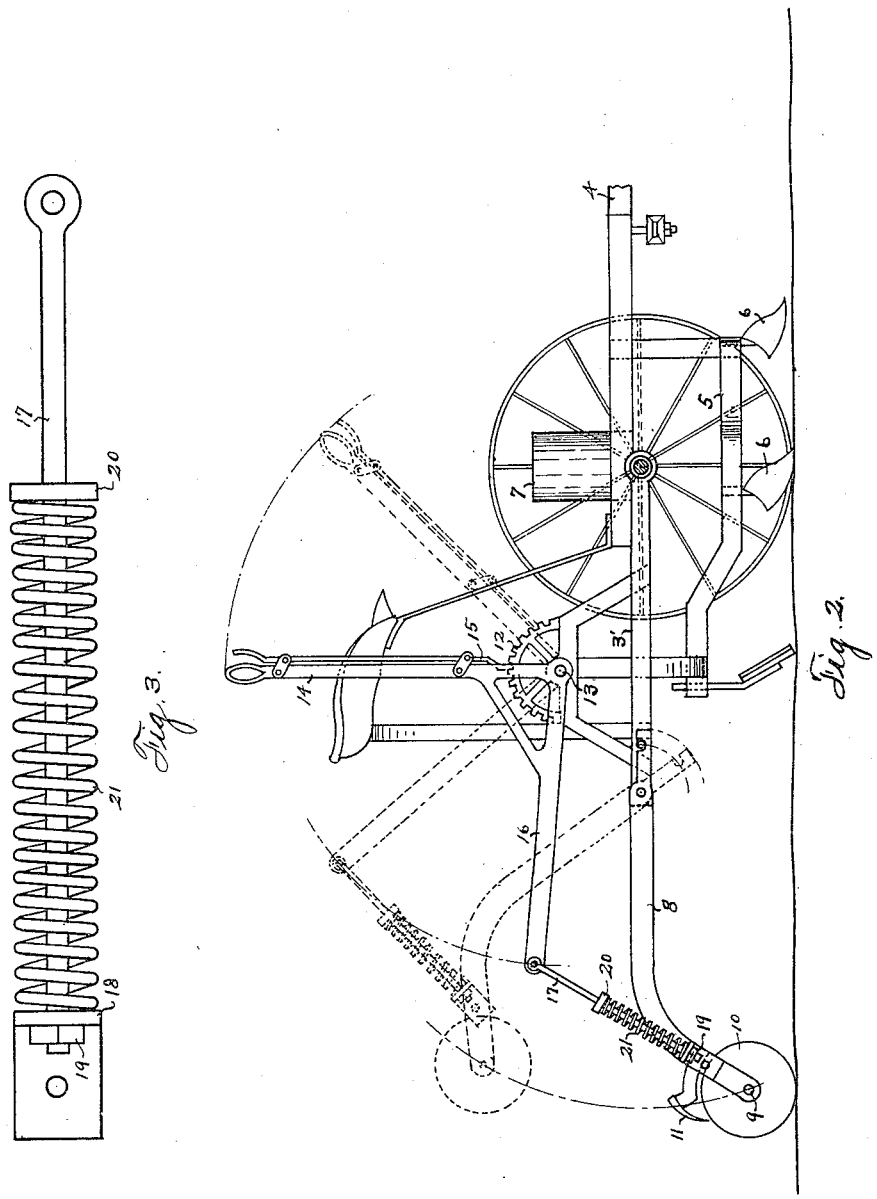

UNITED STATES PATENT OFFICE.

JOSIAH D. DRUMMOND, OF HUNGERFORD, TEXAS.

PLANTER ATTACHMENT.

1,211,558. Specification of Letters Patent. Patented Jan. 9, 1917.

Application filed December 27, 1915. Serial No. 68,607.

*To all whom it may concern:*

Be it known that I, JOSIAH D. DRUMMOND, a citizen of the United States, residing at Hungerford, in the county of Wharton and State of Texas, have invented certain new and useful Improvements in Planter Attachments, of which the following is a specification.

This invention relates to new and useful improvements in a planter attachment.

The object of the invention is to provide a smoothing roller which is attached to and follows the ordinary planter or cultivator and is provided for the purpose of pulverizing clods and smoothing and packing the earth so that it will retain its moisture.

With the above and other objects in view the invention has particular relation to certain novel features of construction and operation an example of which is given in this specification and illustrated in the accompanying drawings wherein:

Figure 1 is a plan view of the device, Fig. 2 is a side elevation thereof, and Fig. 3 shows a plan view of one of the lift rods employed.

Referring now more particularly to the drawings wherein like numerals of reference designate similar parts in each of the figures the numeral 1 refers to the axle upon which the wheels 2, 2, are fixed, said axle being rotatable in suitable bearings of the frame 3 which it supports. Secured to and extending forwardly from the frame is the tongue 4, and depending from the frame is the share support 5 carrying the shares 6, 6, and mounted upon the frame is the seed receptacle 7.

It is not thought necessary to further describe the planter, of which the foregoing is a partial description, as it forms no part of the invention and any well known form of planter or cultivator may be used and to which the device hereinafter described may be attached.

Pivoted to the rear end of the side members 3', 3', of the frame 3, are the respective arms 8, 8, whose rear ends curve downwardly and are formed into bearings wherein the respective ends of the axle 9 rotate. Fixed upon this axle is the smoothing roller 10, adjacent to which is the oblong scraper blade 11, whose respective ends are fixed to the corresponding arms 8, 8. This blade is provided to remove the earth which may adhere to the roller as it passes over the ground surface. Fixed to one side of the frame is the rack 12 and rotatably mounted in suitable bearings of the frame work is the transverse shaft 13, to one end of which the manual lever 14 is fixed. This lever is arranged adjacent the rack 12 and has the dog 15, operated in the usual manner, and provided to engage with the rack to lock the manual lever against movement. Fixed to, and extending from, the respective ends of the shaft 13 are the lift arms 16, 16. Pivoted to the free ends of these lift arms are the lift rods 17, 17 whose lower ends are slidable through orifices in the lugs 18, 18 which project laterally from the arms 8. The free ends of these rods have the nuts 19, 19 secured thereto to prevent their disengagement from said lugs and surrounding said respective rods and interposed between said lugs 18 and the nuts 20, 20 which are fixed on said rod, are the coil springs 21, 21, which operate to hold the roller yieldingly against the ground surface. When it is desired to elevate the roller the manual lever 14 may be disengaged from the rack 12 and moved forwardly, as indicated in Fig. 2 and, through the dog 15, locked in said position. This will operate through the arms 16 and the lift rods 17 to elevate the roller clear of the ground. When the manual lever 14 is manipulated rearwardly the roller 10 will, through the mechanism described, be lowered into contact with the ground surface and, as is apparent, if the manual lever 14 is moved farther rearwardly after the roller is in contact with the ground surface the springs 21, 21, will be compressed and the pressure of the roller against the surface increased, said pressure varying in accordance as the position of said lever 14 is varied.

What I claim is:

1. A device of the character described including a framework mounted upon the carrier wheels including a pair of side members rearwardly extending, a pair of arms pivoted to said side members and extending rearwardly therefrom, a single roller having said bearings which rotate in corresponding bearings in the free ends of said arms, a lug laterally extending from each of said arms having a bearing, a transverse shaft rotatably mounted on the frame, a manual lever fixed to one end thereof, lift arms fixed to and extending rearwardly from the respective ends of said shaft, lift rods, each pivoted at one end to the corresponding lift arms and whose other ends are slidable through said lug bearings, means secured on said last mentioned ends preventing the disengagement of said rods from their bearings, a nut fixed to each rod, and spaced from the corresponding lug and a spring surrounding each rod and interposed between the corresponding nut and lug, and operating to hold the roller yieldably against the earth's surface.

2. A device of the character described including a framework mounted upon the carrier wheels, including a pair of side members rearwardly extending, a pair of arms pivoted thereto and extending rearwardly therefrom, a single roller having side bearings which rotate in corresponding bearings in the free ends of said arms, a laterally extending lug having a bearing secured to each arm, a transverse shaft rotatably mounted on the frame, a manual lever fixed to one end thereof, lift arms fixed to and extending rearwardly from the respective ends of said shaft, lift rods, each pivoted at one end to the corresponding lift arms and whose other ends are slidable through said lug bearings, means secured on said last mentioned ends preventing the disengagement of said rods from their bearings, a nut fixed to each rod, and spaced from the corresponding lug and a resilient member surrounding each rod and interposed between the corresponding nut and lug, and operating to hold the roller yieldably against the earth's surface, and a scraper plate fixed to said arms at the two respective ends and whose edge is arranged adjacent the roller surface.

In testimony whereof I have signed my name to this specification in the presence of two subscribing witnesses.

JOSIAH D. DRUMMOND.

Witnesses:
R. H. DRENNER,
E. I. LAFLEM.